United States Patent
Koehler et al.

(10) Patent No.: US 8,801,935 B2
(45) Date of Patent: *Aug. 12, 2014

(54) HYBRID TFC RO MEMBRANES WITH NON-METALLIC ADDITIVES

(75) Inventors: Jeffrey Alan Koehler, Pasadena, CA (US); Christopher James Kurth, Eden Prairie, MN (US)

(73) Assignee: NanoH2O, Inc., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/293,744

(22) Filed: Nov. 10, 2011

(65) Prior Publication Data

US 2012/0285890 A1     Nov. 15, 2012

Related U.S. Application Data

(60) Provisional application No. 61/412,184, filed on Nov. 10, 2010.

(51) Int. Cl.
| | |
|---|---|
| B01D 39/00 | (2006.01) |
| B01D 39/14 | (2006.01) |
| B01D 29/00 | (2006.01) |
| B01D 29/46 | (2006.01) |
| B01D 67/00 | (2006.01) |
| B01D 61/02 | (2006.01) |
| B01D 69/12 | (2006.01) |
| B01D 69/14 | (2006.01) |
| B01D 71/56 | (2006.01) |

(52) U.S. Cl.
CPC .......... *B01D 67/0009* (2013.01); *B01D 61/025* (2013.01); *B01D 67/0079* (2013.01); *B01D 69/125* (2013.01); *B01D 69/148* (2013.01); *B01D 71/56* (2013.01); *Y10S 977/779* (2013.01); *Y10S 977/783* (2013.01)
USPC . 210/652; 210/490; 210/500.37; 210/500.38; 264/41; 264/650; 264/45.1; 427/243; 427/244; 427/245; 977/779; 977/783

(58) Field of Classification Search
USPC ............ 210/490, 500.37–500.39, 638, 502.1; 264/41, 650, 45.1; 427/243, 244, 245; 977/779, 783; 423/447.2
See application file for complete search history.

(56) References Cited

U.S. PATENT DOCUMENTS

| | | | |
|---|---|---|---|
| 3,133,132 | A | 5/1964 | Loeb et al. |
| 3,133,137 | A | 5/1964 | Loeb et al. |

(Continued)

FOREIGN PATENT DOCUMENTS

| | | |
|---|---|---|
| CA | 2388500 | 4/2001 |
| CA | 2600481 | 9/2006 |

(Continued)

OTHER PUBLICATIONS

"Acetylacetone as Analytical Extraction Agent", J. F. Steinbach and Henry. Freiser, Analytical Chemistry 1954 26 (2), 375-379.*

(Continued)

*Primary Examiner* — Matthew O Savage
*Assistant Examiner* — Benjamin J Behrendt
(74) *Attorney, Agent, or Firm* — Fish & Richardson P.C.

(57) ABSTRACT

A process for preparing a reverse osmosis membrane that includes: (A) providing a polyamine, a polyfunctional acid halide, and a flux increasing additive having the formula $Z^+B^-$ where $Z^+$ is an easily dissociable cation and $B^-$ is a beta-diketonate; (B) combining the polyamine, polyfunctional acid halide, and flux increasing additive on the surface of a porous support membrane; and (C) interfacially polymerizing the polyamine and the polyfunctional acid halide, and flux increasing additive on the surface of the porous support membrane to form a reverse osmosis membrane comprising (i) the porous support membrane and (ii) a discrimination layer comprising a polyamide. The reverse osmosis membrane is characterized by a flux that is greater than the flux of the same membrane prepared in the absence of the flux increasing additive.

17 Claims, 1 Drawing Sheet

(56) References Cited

U.S. PATENT DOCUMENTS

| | | |
|---|---|---|
| 3,260,691 A | 7/1966 | Lavin et al. |
| 3,351,244 A | 11/1967 | Zandberg et al. |
| 3,367,504 A | 2/1968 | Westmoreland |
| 3,417,870 A | 12/1968 | Bray |
| 3,480,588 A | 11/1969 | Lavin et al. |
| 3,567,632 A | 3/1971 | Richter et al. |
| 3,597,393 A | 8/1971 | Bach et al. |
| 3,615,024 A | 10/1971 | Michaels |
| 3,619,424 A | 11/1971 | Bianchard et al. |
| 3,642,707 A | 2/1972 | Frazer |
| 3,648,845 A | 3/1972 | Riley |
| 3,663,510 A | 5/1972 | Peterson |
| 3,687,842 A | 8/1972 | Credali et al. |
| 3,690,811 A | 9/1972 | Horning |
| 3,692,740 A | 9/1972 | Suzuki et al. |
| 3,696,031 A | 10/1972 | Credali et al. |
| 3,710,945 A | 1/1973 | Dismore |
| 3,744,642 A | 7/1973 | Scala et al. |
| 3,791,526 A | 2/1974 | Stana et al. |
| 3,878,109 A | 4/1975 | Ikeda et al. |
| 3,904,519 A | 9/1975 | McKinney et al. |
| 3,906,250 A | 9/1975 | Loeb |
| 3,920,612 A | 11/1975 | Stephens |
| 3,926,798 A | 12/1975 | Cadotte |
| 3,951,815 A | 4/1976 | Wrasidlo |
| 3,993,625 A | 11/1976 | Kurihara et al. |
| 3,996,318 A | 12/1976 | Van Heuven |
| 4,005,012 A | 1/1977 | Wrasidlo |
| 4,020,142 A | 4/1977 | Davis et al. |
| 4,039,440 A | 8/1977 | Cadotte |
| 4,048,144 A | 9/1977 | Stephens |
| 4,051,300 A | 9/1977 | Klein et al. |
| 4,060,488 A | 11/1977 | Hoover et al. |
| 4,092,424 A | 5/1978 | Brandi et al. |
| 4,188,418 A | 2/1980 | Livingston |
| 4,244,824 A | 1/1981 | Lange et al. |
| 4,259,183 A | 3/1981 | Cadotte |
| 4,277,344 A | 7/1981 | Cadotte |
| 4,387,024 A | 6/1983 | Kurihara et al. |
| 4,388,189 A | 6/1983 | Kawaguchi et al. |
| 4,392,960 A | 7/1983 | Kraus et al. |
| 4,492,721 A | 1/1985 | Joosten et al. |
| 4,559,139 A | 12/1985 | Uemura et al. |
| 4,567,009 A | 1/1986 | Badenhop et al. |
| 4,606,943 A | 8/1986 | Rak et al. |
| 4,693,985 A | 9/1987 | Degen et al. |
| 4,707,266 A | 11/1987 | Degen et al. |
| 4,713,438 A | 12/1987 | Harris et al. |
| 4,740,219 A | 4/1988 | Kulprathipanja et al. |
| 4,754,016 A | 6/1988 | Ai et al. |
| 4,762,619 A | 8/1988 | Gaddis et al. |
| 4,765,897 A | 8/1988 | Cadotte et al. |
| 4,765,915 A | 8/1988 | Diehl |
| 4,769,148 A | 9/1988 | Fibiger et al. |
| 4,778,596 A | 10/1988 | Linder et al. |
| 4,814,082 A | 3/1989 | Wrasidlo |
| 4,830,885 A | 5/1989 | Tran et al. |
| 4,833,014 A | 5/1989 | Linder et al. |
| 4,840,977 A | 6/1989 | Crivello et al. |
| 4,859,384 A | 8/1989 | Fibiger et al. |
| 4,872,984 A | 10/1989 | Tomaschke |
| 4,902,424 A | 2/1990 | Wrasidlo |
| 4,911,844 A | 3/1990 | Linder et al. |
| 4,931,362 A | 6/1990 | Zaifkovits et al. |
| 4,948,506 A | 8/1990 | Lonsdale et al. |
| 4,948,507 A | 8/1990 | Tomaschke |
| 4,950,404 A | 8/1990 | Chau |
| 4,971,697 A | 11/1990 | Douden et al. |
| 4,983,291 A | 1/1991 | Chau et al. |
| 5,002,590 A | 3/1991 | Friesen et al. |
| 5,017,680 A | 5/1991 | Sublett |
| 5,019,261 A | 5/1991 | Stengaard |
| 5,024,594 A | 6/1991 | Athayde et al. |
| 5,028,337 A | 7/1991 | Linder et al. |
| 5,069,945 A | 12/1991 | Wrasidlo |
| 5,084,179 A | 1/1992 | Knight |
| 5,089,460 A | 2/1992 | Chien |
| 5,091,086 A | 2/1992 | Stengaard |
| 5,098,575 A | 3/1992 | Yaeli |
| 5,104,632 A | 4/1992 | Douden et al. |
| 5,108,607 A | 4/1992 | Kraus et al. |
| 5,130,025 A | 7/1992 | Lefebvre et al. |
| 5,154,829 A | 10/1992 | Degen et al. |
| 5,160,617 A | 11/1992 | Huis In't Veld et al. |
| 5,173,189 A | 12/1992 | Hoshi et al. |
| 5,190,654 A | 3/1993 | Bauer |
| 5,234,598 A | 8/1993 | Tran et al. |
| 5,254,261 A | 10/1993 | Tomaschke et al. |
| 5,258,203 A | 11/1993 | Arthur |
| 5,262,054 A | 11/1993 | Wheeler |
| 5,269,926 A | 12/1993 | Webster et al. |
| 5,281,430 A | 1/1994 | Herron et al. |
| 5,342,431 A | 8/1994 | Anderson et al. |
| 5,376,442 A | 12/1994 | Davidson et al. |
| 5,462,667 A | 10/1995 | Wollinsky et al. |
| 5,543,046 A | 8/1996 | Van Rijn |
| 5,576,057 A | 11/1996 | Hirose et al. |
| 5,614,099 A | 3/1997 | Hirose et al. |
| 5,650,479 A | 7/1997 | Glugla et al. |
| 5,658,460 A | 8/1997 | Cadotte et al. |
| 5,681,473 A | 10/1997 | Miller et al. |
| 5,693,227 A | 12/1997 | Costa |
| 5,733,602 A | 3/1998 | Hirose et al. |
| 5,755,964 A | 5/1998 | Mickols |
| 5,783,079 A | 7/1998 | Kumano et al. |
| 5,800,706 A | 9/1998 | Fischer |
| 5,843,351 A | 12/1998 | Hirose et al. |
| 5,876,602 A | 3/1999 | Jons et al. |
| 5,914,039 A | 6/1999 | Mahendran et al. |
| 5,938,934 A | 8/1999 | Balogh et al. |
| 5,989,426 A | 11/1999 | Hirose et al. |
| 6,015,495 A | 1/2000 | Koo et al. |
| 6,024,872 A | 2/2000 | Mahendran et al. |
| 6,024,873 A * | 2/2000 | Hirose et al. ............. 210/500.38 |
| 6,117,341 A | 9/2000 | Bray et al. |
| 6,156,867 A * | 12/2000 | Aoyama et al. ............. 528/282 |
| 6,162,358 A | 12/2000 | Li et al. |
| 6,171,497 B1 | 1/2001 | Hirose et al. |
| 6,185,940 B1 | 2/2001 | Prueitt |
| 6,187,192 B1 | 2/2001 | Johnston et al. |
| 6,241,893 B1 | 6/2001 | Levy |
| 6,245,234 B1 | 6/2001 | Koo et al. |
| 6,284,137 B1 | 9/2001 | Hajikano et al. |
| 6,309,546 B1 | 10/2001 | Herrmann et al. |
| 6,337,018 B1 | 1/2002 | Mickols |
| 6,368,507 B1 | 4/2002 | Koo et al. |
| 6,391,205 B1 | 5/2002 | McGinnis |
| 6,406,626 B1 | 6/2002 | Murakami et al. |
| 6,413,425 B1 | 7/2002 | Haschisuka et al. |
| 6,425,936 B1 | 7/2002 | Sammons et al. |
| 6,472,016 B1 | 10/2002 | Soria et al. |
| 6,540,915 B2 | 4/2003 | Patil |
| 6,551,536 B1 | 4/2003 | Kwak et al. |
| 6,562,266 B2 | 5/2003 | Mickols |
| 6,582,495 B2 | 6/2003 | Chau et al. |
| 6,585,802 B2 | 7/2003 | Koros et al. |
| 6,605,140 B2 | 8/2003 | Guiver et al. |
| 6,652,751 B1 | 11/2003 | Kutowy et al. |
| 6,723,241 B2 | 4/2004 | Mickols |
| 6,753,396 B2 | 6/2004 | Ulbricht et al. |
| 6,755,900 B2 | 6/2004 | Koros et al. |
| 6,821,430 B2 | 11/2004 | Andou et al. |
| 6,837,996 B2 | 1/2005 | Kurth et al. |
| 6,841,075 B2 | 1/2005 | Penth et al. |
| 6,841,601 B2 | 1/2005 | Serpico et al. |
| 6,878,278 B2 | 4/2005 | Mickols |
| 6,890,436 B2 | 5/2005 | Komatsu et al. |
| 7,018,538 B2 | 3/2006 | Leiser et al. |
| 7,109,140 B2 | 9/2006 | Marand et al. |
| 7,138,058 B2 | 11/2006 | Kurth et al. |
| 7,182,894 B2 | 2/2007 | Kumar et al. |
| 7,211,320 B1 | 5/2007 | Cooper et al. |
| 7,311,982 B2 | 12/2007 | Christou et al. |
| 7,459,121 B2 | 12/2008 | Liang et al. |

(56) References Cited

U.S. PATENT DOCUMENTS

| | | |
|---|---|---|
| 7,604,746 B2 | 10/2009 | Childs et al. |
| 7,871,522 B2 | 1/2011 | Stover et al. |
| 7,955,656 B2 | 6/2011 | Murayama et al. |
| 8,002,989 B2 | 8/2011 | McGinnis |
| 8,147,735 B2 | 4/2012 | Buschmann |
| 8,177,978 B2 | 5/2012 | Kurth et al. |
| 2002/0074282 A1 | 6/2002 | Herrmann et al. |
| 2002/0187401 A1 | 12/2002 | Lee et al. |
| 2003/0116498 A1* | 6/2003 | Mickols ............. 210/483 |
| 2003/0116503 A1 | 6/2003 | Wang et al. |
| 2003/0121844 A1 | 7/2003 | Koo et al. |
| 2003/0132174 A1 | 7/2003 | Isomura et al. |
| 2004/0178135 A1 | 9/2004 | Beplate |
| 2004/0234751 A1 | 11/2004 | Sakurai et al. |
| 2005/0077243 A1 | 4/2005 | Pinnau et al. |
| 2005/0139066 A1 | 6/2005 | Miller et al. |
| 2005/0145568 A1 | 7/2005 | McGinnis |
| 2005/0173341 A1 | 8/2005 | Salinaro |
| 2005/0230305 A1 | 10/2005 | Kulkarni et al. |
| 2006/0063911 A1 | 3/2006 | Cayton et al. |
| 2006/0175256 A1 | 8/2006 | Masten et al. |
| 2006/0201884 A1 | 9/2006 | Kulprathipanja et al. |
| 2006/0204812 A1 | 9/2006 | Moriyama et al. |
| 2006/0249447 A1 | 11/2006 | Yeager |
| 2008/0149561 A1 | 6/2008 | Chu et al. |
| 2008/0237126 A1 | 10/2008 | Hoek et al. |
| 2008/0251447 A1 | 10/2008 | Koumoto et al. |
| 2009/0159527 A1 | 6/2009 | Mickols et al. |
| 2009/0272692 A1 | 11/2009 | Kurth et al. |
| 2010/0006495 A1 | 1/2010 | Buschmann |
| 2010/0025330 A1 | 2/2010 | Ratto et al. |
| 2010/0044902 A1 | 2/2010 | Ohara et al. |
| 2010/0062156 A1* | 3/2010 | Kurth et al. ............. 427/243 |
| 2011/0155660 A1 | 6/2011 | Mickols et al. |
| 2012/0285890 A1 | 11/2012 | Koehler et al. |

FOREIGN PATENT DOCUMENTS

| | | |
|---|---|---|
| EP | 348041 | 12/1989 |
| JP | S59-199001 | 11/1984 |
| JP | 61-156165 | 7/1986 |
| JP | 63-012310 | 1/1988 |
| JP | 4126529 | 4/1992 |
| JP | 05-245349 | 9/1993 |
| JP | H08-182921 | 7/1996 |
| JP | 2000-225327 | 8/2000 |
| JP | 2006-187731 | 7/2006 |
| KR | 1020050077141 | 8/2005 |
| WO | 00/78437 | 12/2000 |
| WO | 01/78882 | 10/2001 |
| WO | 02/004082 | 1/2002 |
| WO | 02/15299 | 2/2002 |
| WO | 02/051528 | 7/2002 |
| WO | 03/047734 | 6/2003 |
| WO | 03/097218 | 11/2003 |
| WO | 03/097221 | 11/2003 |
| WO | 2005/014266 | 2/2005 |
| WO | 2005/023414 | 3/2005 |
| WO | 2005/057700 | 6/2005 |
| WO | 2006/098872 | 9/2006 |
| WO | 2006/135384 | 12/2006 |
| WO | 2007/001405 | 1/2007 |
| WO | 2007/024461 | 3/2007 |
| WO | 2007/035019 | 3/2007 |
| WO | 2007/050408 | 5/2007 |
| WO | 2007/065866 | 6/2007 |
| WO | 2007/084169 | 7/2007 |
| WO | 2007/095363 | 8/2007 |
| WO | 2007/133362 | 11/2007 |
| WO | 2007/133609 | 11/2007 |
| WO | 2008/057842 | 5/2008 |
| WO | 2008/066939 | 6/2008 |
| WO | 2008/091658 | 7/2008 |
| WO | 2008/118228 | 10/2008 |
| WO | 2009/129354 | 10/2009 |
| WO | 2010/123518 | 10/2010 |

OTHER PUBLICATIONS

Authroized Officer S. Jo. International Search Report in International Application No. PCT/US2011/060157, dated Jun. 28, 2012, 9 pages.

Arthur, "Structure-Property Relationship in a Thin Film Composite Reverse Osmosis Membrane," *Journal of Membrane Science*, 1989, 46:243-260.

Bermudez et al, "Infinite Dilution Activity Coefficients in Tributyl Phosphate and Triacetin," *J. Chem. Eng. Data*, 2000, 45:1105-1107.

Bhattacharyya et al., "An Overview of Selected Membrane Techniques for Environmental Applications," *J. Chin. Inst. Cham. Engrs.*, 2002, 33(1):62-66.

Cadotte et al., "Advanced Poly (Piperazineamide) Reverse Osmosis Membranes" *NTIS: Final Report*, 1979, pp. 1-48.

Cadotte et al., "Continued Evaluation of in Situ-Formed Condensation Polymers for Reverse Osmosis Membranes" *NTIS: Final Report*, 1976, 92 pages.

Cadotte et al., "Research on 'In Situ'-Formed Condensation Polymer for Reverse Osmosis Membranes" *NTIS: Final Report*, 1978, 56 pages.

Cadotte, J.E., "Evolution of Composite Reverse Osmosis Membranes," *Materials Science of Synthetic Membranes*, 1985, pp. 274-294.

Camblor et al. "Characterization of nanocrystalline zeolite Beta," *Microporous and Mesoporous Materials*, 1998, 25(1-3):59-74.

Chui, et al. "A Chemically Functionalizable Nanoporous Material [$Cu_3(TMA)_2(H_2O)_3]_n$," *Science*, 1999, 283:1148-1150.

Holmberg et al. "Controlling size and yield of zeolite Y nanocrystals using tetramethylammonium bromide," *Microporous and Mesoporous Materials*, 2003, 59(1):13-28.

Jeong et al., "Interfacial polymerization of thin film nanocomposites: A new concept for reverse osmosis membranes," *Journal of Membrane Science*, 2007, 294:1-7.

Kang et al., "A Novel Method of Surface Modification on Thin-Film Composite Reverse Osmosis Membrane by Grafting (Ethylene Glycol)" *Polymer*, 2007, 48(5):1165-1170.

Wang et al., "Formation of semi-permeable polyamide skin layers on the surface of supported liquid membranes," *Journal of Membrane Science*, 1998, 147:109-116.

\* cited by examiner

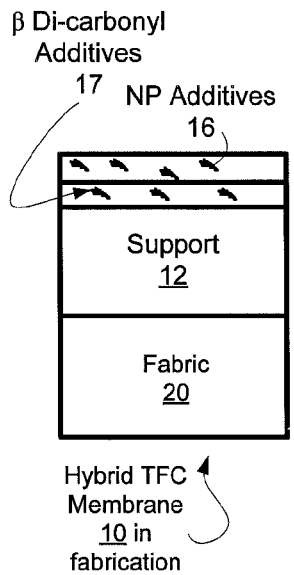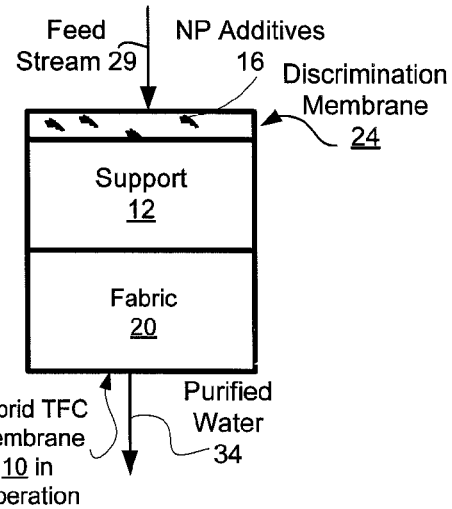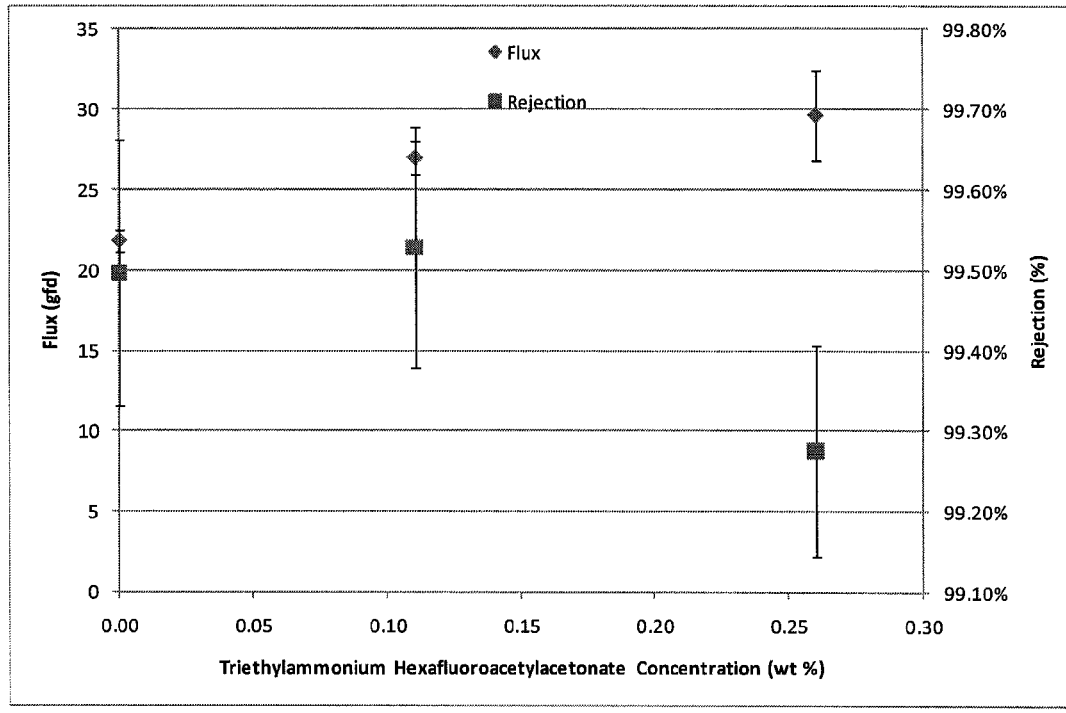
FIG 1
FIG 2
FIG 3

HYBRID TFC RO MEMBRANES WITH NON-METALLIC ADDITIVES

CROSS REFERENCE TO RELATED APPLICATIONS

This application claims priority to U.S. Provisional Application Ser. No. 61/412,184 filed Nov. 10, 2010, the contents of which are hereby incorporated by reference in their entirety.

TECHNICAL FIELD

This invention is related to discrimination membranes for use in reverse osmosis and forward osmosis processes, e.g., for purifying water.

BACKGROUND

Reverse osmosis membranes made by interfacial polymerization of a monomer in a nonpolar (e.g., organic) phase together with a monomer in a polar (e.g., aqueous) phase on a porous support membrane are known as TFC membranes and are used where flux and substantial rejection characteristics are required, for example in the purification of water. Various materials have been added to TFC membranes in the hopes of increasing flux without reducing rejection characteristics and have met with limited success. In addition, such membranes are subject to fouling resulting in reduced flux as contaminants, for example from the brackish or seawater to be purified, are believed to build up on the surface of the discrimination layer of the TFC membrane.

SUMMARY

A process for preparing a reverse osmosis membrane is described that includes: (A) providing a polyamine, a polyfunctional acid halide, and a flux increasing additive having the formula $Z^+B^-$ where $Z^+$ is an easily dissociable cation and $B^-$ is a beta-diketonate; (B) combining the polyamine, polyfunctional acid halide, and flux increasing additive on the surface of a porous support membrane; and (C) interfacially polymerizing the polyamine and the polyfunctional acid halide, and flux increasing additive on the surface of the porous support membrane to form a reverse osmosis membrane comprising (i) the porous support membrane and (ii) a discrimination layer comprising a polyamide. The reverse osmosis membrane is characterized by a flux that is greater than the flux of the same membrane prepared in the absence of the flux increasing additive.

The polyamine may be selected from the group consisting of diaminobenzene, triaminobenzene, m-phenylene diamine, p-phenylene diamine, 1,3,5-diaminobenzoic acid, 2,4-diaminotoluene, 2,4-diaminoanisole, xylylene diamine, ethylenediamine, propylenediamine, piperazine, and tris(2-aminoethyl)amine. The polyfunctional acid halide is selected from the group consisting of trimesoyl chloride, trimellitic acid chloride, isophthaloyl chloride, and terephthaloyl chloride.

In some embodiments, the polyamine, polyfunctional acid halide, and flux increasing additive may be combined with nanoparticles (e.g., zeolites or carbon nanotubes). Interfacial polymerization then yields a reverse osmosis membrane that includes (i) the porous support membrane and (ii) a discrimination layer comprising a polyamide and the nanoparticles. The porous support membrane may also include nanoparticles. In other embodiments, the polyamine, polyfunctional acid halide, and flux increasing additive may be combined with mono-hydrolyzed trimesoyl chloride prior to the interfacial polymerization.

In some embodiments, $Z^+$ has the formula $R^1R^2R^3R^4N^+$, where $R^1$, $R^2$, $R^3$, and $R^4$, independently, are H, a $C_1$-$C_6$ hydrocarbyl group, a benzyl group, or a phenyl group. For example, in some embodiments, $R^1$, $R^2$, $R^3$, and $R^4$ are ethyl groups, while in other embodiments, each $R^1$, $R^2$, and $R^3$ group is an ethyl group, and $R^4$ is H.

$B^-$ may have the formula:

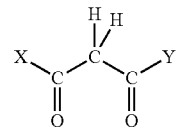

where X and Y, independently, are H, a $C_1$-$C_6$ hydrocarbyl group, a benzyl group, a phenyl group, $-OR^5$, or $NR^6R^7$, each optionally substituted with fluorine, and $R^5$, $R^6$, and $R^7$, independently, are H, a $C_1$-$C_6$ hydrocarbyl group, a benzyl group or a phenyl group. For example, X and Y may be methyl groups, or X and Y may be trifluoromethyl group.

Reverse osmosis membranes prepared according to this process may be capable of exhibiting a flux of at least 30 gfd, determined by exposing the membrane to deionized water containing 32,000 ppm NaCl at a temperature of 25° C. and a pressure of 800 psi. the membranes may also be capable of exhibiting a salt rejection of at least 99.5%, determined by exposing the membrane to deionized water containing 32,000 ppm NaCl at a temperature of 25° C. and a pressure of 800 psi. The membranes may be used to purify brackish water or seawater.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1 is a block diagram of hybrid TFC membrane 10 during fabrication in which aqueous phase 14 including β-carbonyl additive 17, which may be positioned on support 12, which may be strengthened by fabric 20, contacted by organic phase 14 which may include nanoparticle additives 16 to create a thin film TFC membrane by interfacial polymerization (IFP).

FIG. 2 is a block diagram of hybrid TFC membrane 10 during operation in which feed stream 29 is applied to discrimination membrane 24—formed by IFP in the presence of a β-carbonyl additive 17 and/or nanoparticle additives 16—through which purified water 34 permeates while salts and other contaminants are rejected.

FIG. 3 is a graph of the test results for 0.11 wt % and 0.26 wt % $Et_3NH(F_6acac)_2$ additive 17 with error bars indicating +/−standard deviation representing the numerical test results shown in Table 1.

Like reference symbols in the various drawings indicate like elements.

DETAILED DESCRIPTION

A TFC membrane may be advantageously formed by interfacial polymerization (IFP) between an organic phase which may optionally contain nanoparticle additives and an aqueous phase containing a β-carbonyl anion, released from a β-carbonyl additive, such as triethylammonium hexafluoro-acetylacetonate. In general, the β-carbonyl additive is in the form of $Z^+B^-$ where Z may be $H^+$ or Z may be $R^1R^2R^3R^4N^+$ where $R^1R^2R^3R^4$ may be independently —H, —$C_1$-$C_6$ hydrocarbyl, -benzyl or -phenyl. For example, in some embodiments, $R^1$, $R^2$, $R^3$, and $R^4$ are ethyl groups, while in other embodiments, each $R^1$, $R^2$, and $R^3$ group is an ethyl group, and $R^4$ is H.

B may be:

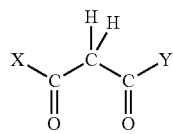

where Y and X may be independently —H, —$C_1$-$C_6$-hydrocarbyl, -benzyl, -phenyl, —$OR_5$, or —$NR^6R^7$, each optionally substituted by fluorine, wherein $R^5$, $R^6$, and $R^7$ are independently —H, —$C_1$-$C_6$-hydrocarbyl, -benzyl or -phenyl. In another preferred embodiment, X and Y may be $CH_3$ so that B may be the β-dicarbonyl compound acetylacetone, optionally substituted with fluorine.

$Z^+B^-$ is easily dissociated in the aqueous phase solution.

$B^-$ is preferably added in an amount that improves the permeability or flux of said reverse osmosis membrane and/or which maintains the salt rejection at a level greater than that of a control membrane made without additive. For example, the flux improvement preferably is on the order of at least 20%, at least 35% and preferably at least 50%. The salt rejection preferably is at a level of at least 99% and preferably at least 99.5%. The flux is preferably at least 27 gfd, more preferably at least 30 gfd, and most preferably on the order of about at least 35 gfd, while the salt rejection is on the order of about at least 99% or preferable on the order of about 99.5%.

In addition to triethylamine, several other bases may be used to form the β-diketonate salt. For instance, other alkyl or substituted alkyl groups may be present on the nitrogen, and the alkyl group may be either all the same, may be different. In addition to tri-substituted amines, ammonia, primary or secondary amines may be used. Quaternary ammonium hydroxide solutions may also be used to prepare quaternary salts. Other nitrogenous bases may also be used including aniline, or aromatic substituted nitrogens, and heterocycles such as piperazine, pyridine, or imidazole.

Effective β-diketonates include 5-carbon or larger carbon framework compounds where ketones are present on either side of a proton containing carbon atom. Atoms and substitutents may be present throughout the compound. Other electron withdrawing substituents such as fluorine can more preferably be present adjacent to the ketones to aid in the formation of the enolate compound.

FIGS. 1 and 2 describe a representative process for preparing a reverse osmosis membrane by IFP using a $Z^+B^-$ flux enhancing additive. The discrimination layer of the membrane illustrated in FIGS. 1 and 2 also contains nanoparticles 16; the resulting TFC membrane is referred to as a "hybrid TFC" membrane. Such nanoparticles, however, are optional.

Referring now to FIGS. 1 and 2, a hybrid TFC membrane is shown in fabrication and then again in operation. In fabrication, aqueous phase 14 is applied to support membrane 12, which preferably rests on fabric 20. Support membrane 12 is typically a polymeric microporous support membrane, which in turn is often supported by non-woven or woven fabrics, such as fabric 20, for mechanical strength. Fabric 20 is preferably a polyester fabric having a basis weight of 60-120 grams per meter or gsm, and a thickness of 50-200 microns. Support membrane 12 may be made from polysulfone or other suitably porous membranes, such as polyethersulfone, poly(ether sulfone ketone), poly(ether ethyl ketone), poly (phthalazinone ether sulfone ketone), polyacrylonitrile, polypropylene, cellulose acetate, cellulose diacetate, or cellulose triacetate. Support membrane 12 may be 25-100 nm in thickness, preferably about 35 nm to about 75 nm and most preferably about 50 nm in thickness and may have the smallest pores located very near the upper surface. Porosity at the surface may be low, for instance from 5-15% of the total surface area.

Aqueous phase 14 contains a β-dicarbonyl additive 17, such as $Et_3NH(F_6acac)_2$. It is believed that $Et_3NH(F_6acac)_2$ is easily dissociated into an $Et_3NH^+$ cation $Z^+$ and an $(F_6acac)_2^-$ anion in aqueous phase 14. Additive 17, as shown in FIG. 1, has the formula $Z^+B^-$, wherein B is an acetylacetonate moiety defined above and Z is an easily dissociated moiety such as ammonium ion defined above, which improves the permeability of the resulting reverse osmosis membrane 10 relative to a control membrane made without additive 17. Without wishing to be bound by theory, it is thought that additive 17 interferes with full cross linking of the polyfunctional acid halide (e.g., trimesoyl chloride) and polyamine (e.g., methylene phenylene diamine) compounds during IFP.

Aqueous phase 14 is contacted with organic phase 18, which may contain another additive such as nanoparticles 16, to create discrimination membrane 24 by IFP as illustrated in FIG. 2. Examples of nanoparticles, including nanostructured materials such as carbon nanotubes and metal organic frameworks (MOF), that may be combined with the polyamine, polyfunctional acid halide, and beta-diketonate flux increasing additive, include:

Linde Type A (LTA) zeolites available freeze dried, 100 nm diameter from Nanoscape AG, Am Klopferspitz 19, D-82152 Planegg, Germany;

Linde Type Y (FAU) zeolites as described in MICROPOROUS AND MESOPOROUS MATERIALS Volume: 59 Issue: 1 Pages: 13-28 Published: APR 18 2003 by Holmberg B A, Wang H T, Norbeck J M, Yan Y S;

Zeolite Beta as described in MICROPOROUS AND MESOPOROUS MATERIALS Volume: 25 Issue: 1-3 Pages: 59-74 Published: Dec. 9, 1998 by Camblor M A, Corma A, Valencia S); and Cu MOF: A metal organic framework complex prepared from Cu and trimesic acid as described in Science 283, 1148 (1999); Stephen S.-Y. Chui, et al. "[Cu3(TMA)2(H2O)3]n A Chemically Functionalizable Nanoporous Material".

Either during IFP, or once the polymer matrix is formed, the anion believed to be present in this solution may interfere with the formation of covalent crosslinking Instead, ionic cross linkages between the hydrolyzed acyl halide groups and the terminal amines are formed. Such ionic cross-links, compared to the largely covalently crosslinked controls, promote increased water uptake and flux. At the same time, rejection may be maintained by virtue of these ionic crosslinks between the charged groups. Relative to ionic interactions in solution, these ionic crosslinks are stabilized by the rigidity of the polymer network keeping the two charged centers close to each other. The ionic crosslink may also allow a slight expansion of the matrix relative to a covalent bond, thereby increasing water uptake.

EXAMPLES

The general procedure for the preparation of a flat cell test membrane was to prepare aqueous and organic phases, add the desired additives to one or both of these phases, apply the aqueous phase to a wet polysulfone membrane support on a glass plate, and then apply the organic phase to the aqueous phase on the membrane support as described in more detail immediately below. Control membranes were made in a similar way, except without the additive(s). All performance data unless otherwise noted was obtained from flat sheet testing on NaCl (32,000 ppm·53 mS/cm) in tap water tested at 25° C. and 800 psi. Flow and rejection were measured after 1 hour of running Aqueous Phase 14: An aqueous solution of MPD, 4.5 wt % of triethylammonium camphorsulfonate (TEACSA), and 0.06 wt % sodium lauryl sulfate (SLS) in DI water, and 0, 0.11, or 0.26 wt. % $Et_3NH(F_6acac)_2$ was prepared. $Et_3NH(F_6acac)_2$ was synthesized in-house and used without further purification. The procedure used was:

- Add 25 g ampoule hexafluoroacetylacetone (98%, Aldrich 238309, Lot MKBB2482) to 100 ml n-hexane that was stored over molecular sieves (96%, Acros 364370010, Lot 0930139) with stirring.
- Add 12.14 g triethylamine (Fluka 90342, Lot 1389546) added with stirring.
- 2 phases formed with bottom being a deep yellow color.
- After ca. 30 minutes, top layer decanted off and yellow phase stored overnight.
- Small amount of less dense phase collected overnight on top of the yellow phase and was removed the next day.

Organic Phase 18: An Isopar G® solution with 0.3 wt. % TMC and 4 wt. % mesitylene was also prepared and sonicated for up to 60 minutes. Isopar is a trademark of Exxon Corp.

Support membrane 12: A piece of wet polysulfone support was placed flat on a clean glass plate. An acrylic frame was then placed onto the membrane surface, leaving an area for the interfacial polymerization reaction to take place.

Discrimination membrane 24: Approximately 50 mL of the aqueous MPD solution was poured onto the framed membrane surface and remained for up to 2 min. The solution was drained by tilting the frame till no solution dripped from the frame.

i) The frame was taken off, and was left horizontally for 1 minute. The membrane was then clamped with the glass plate in four corners. An air knife was used to finish drying the membrane surface. The membrane was reframed using another clean and dry acrylic frame and kept horizontally for 1 min.

ii) Approximately 50 mL of the organic solution was poured onto the framed membrane surface and remained for 2 minutes. The solution was drained by tilting the frame (vertically) till no solution dripped from the frame. The acrylic frame was removed, and the membrane was kept horizontally for 1 minute. The membrane was then dried at 95° C. for 6 minutes.

Two TFC membranes were synthesized and tested for each condition.

Referring now to FIG. 3, the results of the testing above discussed above for 0.11 wt % and 0.26 wt % $Et_3NH(F_6acac)_2$ additive 17 are shown with error bars indicating +/−standard deviation. These tests show that both flux and rejection are affected by the concentration of $Et_3NH(F_6acac)_2$ in a similar manner as they are affected by the addition of certain other additives 17 such as alkaline earth additives. Table 1 below provides the test numerical results. Example 1, which contained no beta-diketonate additive, was used as a control.

TABLE 1

Membranes with $Et_3NH(F_6acac)_2$ additives 17

| x.# | MPD | TMC | Ratio | Aqueous 14 | FLUX GFD | REJ. |
|---|---|---|---|---|---|---|
| 1 | 4% | 0.3% | 13.3 | | 21.8 | 99.5% |
| 2 | 4% | 0.3% | 13.3 | 0.11 wt % $Et_3NH(F_6acac)_2$ | 26.9 | 99.53% |
| 3 | 4% | 0.3% | 13.3 | 0.26 wt % $Et_3NH(F_6acac)_2$ | 29.6 | 99.27% |
| 4 | 4% | 0.3% | 13.3 | 0.13 wt % $Et_3NH(F_6acac)_2$ | 30 | 99.57% |
| 5 | 4% | 0.3% | 13.3 | 0.36 wt % $Et_3NH(F_6acac)_2$ | 32 | 99.52% |
| 6 | 4% | 0.3% | 13.3 | 0.13 wt % $Et_4N(F_6acac)2$ | 32 | 99.57% |
| 7 | 4% | 0.3% | 13.3 | 0.28 wt % $Et_4N(F_6acac)2$ | 34 | 99.5% |
| 8 | 4% | 0.3% | 13.3 | 0.08 wt % $F_6acac$ | 32 | 99.57% |
| 9 | 4% | 0.3% | 13.3 | 0.17 wt % $F_6acac$ | 35.5 | 99.45% |

Without being restricted to this hypothesis, it is believed that the mechanism of action of these β-diketonate salts may be a result of an interaction or reaction with one or more of the acyl chloride functionalities present on the TMC in organic phase 18. β-diketonate compounds and their enolate salts may react with acyl halides either through the carbon adjacent to both ketones, a substituted ketone, or through the oxygen forming an ester. These formed compounds may either participate directly in the film formation, may react with end groups present after the initial polymerization, or the formed compound itself may undergo further reactions leading the true effective agent. These formed compounds are believed to be particularly effective when produced in concert with the IFP reaction itself, perhaps due to a decreased tendency to reduce molecular weight that may occur if the compound were present at the onset of the polymerization reaction. This may occur when the β-diketonate is brought into contact with TMC at the same time, or after the amine reactant.

This reaction may occur either in aqueous phase 18 after a small amount of TMC partitions into aqueous phase 14, at the aqueous-organic phase interface, or in organic phase 18 after the substituted ammonium β-diketonate salt partitions into organic solution 18.

A number of embodiments of the invention have been described. Nevertheless, it will be understood that various modifications may be made without departing from the spirit and scope of the invention. Accordingly, other embodiments are within the scope of the following claims.

What is claimed is:

1. A process for preparing a reverse osmosis membrane, comprising:
   (A) providing a polyamine, a polyfunctional acid halide, and a flux increasing additive consisting of $Z^+B^-$, where $Z^+$ is $H^+$ or has the formula $R^1R^2R^3R^4N^+$, where $R^1$, $R^2$, $R^3$, and $R^4$, independently, are H, a $C_1$-$C_6$ hydrocarbyl group, a benzyl group, or a phenyl group, and $B^-$ is a beta-diketonate;
   (B) combining the polyamine, polyfunctional acid halide, and flux increasing additive on the surface of a porous support membrane; and
   (C) interfacially polymerizing the polyamine and the polyfunctional acid halide, in the presence of the flux increasing additive on the surface of the porous support membrane to form a reverse osmosis membrane comprising (i) the porous support membrane and (ii) a discrimination layer comprising a polyamide, wherein the reverse osmosis membrane is characterized by a flux that is greater than the flux of the same membrane prepared in the absence of the flux increasing additive.

2. A process according to claim 1, wherein the polyamine is selected from the group consisting of diaminobenzene, triaminobenzene, m-phenylene diamine, p-phenylene diamine, 1,3,5-diaminobenzoic acid, 2,4-diaminotoluene, 2,4-diaminoanisole, xylylene diamine, ethylenediamine, propylenediamine, piperazine, and tris(2-aminoethyl)amine.

3. A process according to claim 1, wherein the polyfunctional acid halide is selected from the group consisting of trimesoyl chloride, trimellitic acid chloride, isophthaloyl chloride, and terephthaloyl chloride.

4. A process according to claim 1, comprising combining the polyamine, polyfunctional acid halide, flux increasing additive, and nanoparticles; and interfacially polymerizing the polyamine and the polyfunctional acid halide on the surface of the porous support membrane to form a reverse osmosis membrane comprising (i) the porous support membrane and (ii) a discrimination layer comprising a polyamide and the nanoparticles.

5. A process according to claim 1, wherein the porous support membrane comprises nanoparticles.

6. A process according to claim 5, wherein the nanoparticles comprise carbon nanotubes.

7. A process according to claim 5, wherein the nanoparticles comprise zeolites.

8. A process according to claim 1, wherein $R^1$, $R^2$, $R^3$, and $R^4$ are ethyl groups.

9. A process according to claim 1, wherein each $R^1$, $R^2$, and $R^3$ group is an ethyl group, and $R^4$ is H.

10. A process according to claim 1, wherein $B^-$ has the formula:

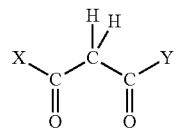

where X and Y, independently, are H, a $C_1$-$C_6$ hydrocarbyl group, a benzyl group, a phenyl group, —$OR^5$, or $NR^6R^7$, each optionally substituted with fluorine, and $R^5$, $R^6$, and $R^7$, independently, are H, a $C_1$-$C_6$ hydrocarbyl group, a benzyl group or a phenyl group.

11. A process according to claim 10, wherein X and Y are methyl groups.

12. A process according to claim 10, wherein X and Y are trifluoromethyl groups.

13. A process according to claim 1, comprising combining the polyamine, polyfunctional acid halide, flux increasing additive, and mono-hydrolyzed trimesoyl chloride; and interfacially polymerizing the polyamine and the polyfunctional acid halide on the surface of the porous support membrane to form a reverse osmosis membrane comprising (i) the porous support membrane and (ii) a discrimination layer comprising a polyamides.

14. A reverse osmosis membrane prepared according to the process of claim 1.

15. A reverse osmosis membrane according to claim 14, wherein the membrane is capable of exhibiting a flux of at least 30 gfd, determined by exposing the membrane to deionized water containing 32,000 ppm NaCl at a temperature of 25° C. and a pressure of 800 psi.

16. A reverse osmosis membrane according to claim 14, wherein the membrane is capable of exhibiting a salt rejection of at least 99.5%, determined by exposing the membrane to deionized water containing 32,000 ppm NaCl at a temperature of 25° C. and a pressure of 800 psi.

17. A method of purifying brackish water or seawater comprising contacting the brackish water or seawater with a reverse osmosis membrane according to claim 14.

* * * * *